(12) United States Patent
Muir

(10) Patent No.: US 11,821,766 B2
(45) Date of Patent: Nov. 21, 2023

(54) SYSTEMS FOR AND METHODS OF MONITORING WATER CONSUMPTION

(71) Applicant: Brendan Muir, Highland Ranch, CO (US)

(72) Inventor: Brendan Muir, Highland Ranch, CO (US)

(*) Notice: Subject to any disclaimer, the term of this patent is extended or adjusted under 35 U.S.C. 154(b) by 882 days.

(21) Appl. No.: 16/591,395

(22) Filed: Oct. 2, 2019

(65) Prior Publication Data
US 2020/0141775 A1    May 7, 2020

Related U.S. Application Data

(60) Provisional application No. 62/740,194, filed on Oct. 2, 2018.

(51) Int. Cl.
*G01F 1/60* (2006.01)
*H04W 4/38* (2018.01)
*G06Q 40/06* (2012.01)

(52) U.S. Cl.
CPC .............. *G01F 1/60* (2013.01); *G06Q 40/06* (2013.01); *H04W 4/38* (2018.02)

(58) Field of Classification Search
CPC ............ G01F 1/60; G06Q 40/06; H04W 4/38
See application file for complete search history.

(56) References Cited

U.S. PATENT DOCUMENTS

| | | | |
|---|---|---|---|
| 9,429,453 B1* | 8/2016 | O'Keeffe | G01F 1/68 |
| 2014/0245208 A1* | 8/2014 | Javey | H04Q 9/00 |
| | | | 715/771 |
| 2017/0335550 A1* | 11/2017 | Sterling | E03B 7/072 |
| 2018/0230681 A1* | 8/2018 | Poojary | E03B 7/072 |

OTHER PUBLICATIONS

Property owners installing water-efficient toilets see quicker roi, increased sustainability. Blog [online]. Niagra Corp, 2017 [retrieved on Jun. 6, 2022]. Retrieved from the Internet: <URL: https://niagaracorp.com/news/property-owners-installing-water-efficient-toilets-see-quicker-roi-increased-sustainability/>.*

* cited by examiner

*Primary Examiner* — Julie M Shanker
(74) *Attorney, Agent, or Firm* — Kutak Rock LLP; Brian L. Main

(57) ABSTRACT

A system for and methods of monitoring and reporting water consumption is provided. The system includes a sensor for detecting field fluctuations associated with a water meter of a water system. The system detects, tracks, and analyzes fluctuations so as to correlate one or more water event with its source(s), such as by determining a start time, end time, volume, and/or cadence associated with the water event. Information associated with the field fluctuations is parsed out to identify fingerprints associated with a variety of water events. The system includes a "decisioning engine" for determining one or more course of action following identification of one or more water event. Courses of action include triggering or invoking a variety of system functions, including: providing an alert or other notification; flagging or otherwise reporting information, including budget and/or consumption information; updating a budget; aggregating information; or the like.

12 Claims, 10 Drawing Sheets

| | |
|---|---|
| Start Time | (ex: 2016-09-25 13:04:04.000) |
| End Time | (ex: 2016-09-25 13:06:46.000) |
| Duration | (ex: 162 seconds) |
| Pulse Count | (337 pulses) |
| | (total number of magnetic pulses counted/tracked during the water event) |
| Volume (Estimated Gallons) | (ex: 1.72 gallons) |
| | (this is calculated by dividing the pulse count by the average pulse per gallon rating for the water meter and system as calibrated. This value is read from the meter spec or can be measured more precisely and directly using a known/measured volume test) |
| Base Flow Data String | (ex: 2,1,1,1,1,1,1,2,1,2,2,1,2,2,2,2,3,2,2,3,2,3,2,3,2,3,3,3,3,2,3,4,3,3,3,3,3,3,3,4,3,3,3,3,3, 3,4,3,3,3,3,4,3,3,3,4,3,3,4,3,3,4,3,3,4,4,4,3,4,4,3,4,4,3,4,3,,4,3,4,3,3,4,3,4,3,3,4,3,3,4,3,3, 3,3,3,3,2,2,3,2,2,1,2,2,1,2,1,1,1,1,1,1,1,1,1,1,1,1,1,1,1,1,1,1,1,1,1,1,1,1,1,1,1,1,1,1,1 ) |
| | (this value has 162 comma-delimited readings, since we are sampling at 1 hz and the event lasted 162 seconds. The sum of all the values derives the total pulse count of 337) |
| Mean Flow Data Value | (ex: 2) (Mathematical Average of all the values comprising the Base Flow Data String) |
| Mode Flow Data Value | (ex: 3)(Mathematical Mode of all the values comprising the Base Flow Data String) |
| Median Flow Data Value | (ex: 3)(Mathematical Median of all the values comprising the Base Flow Data String) |
| Max Flow Data Value | (ex: 4)(Mathematical Max of all the values comprising the Base Flow Data String) |
| Min Flow Data Value | (ex: 1)(Mathematical Min of all the values comprising the Base Flow Data String) |
| Differential Flow Data String | (ex: 0,-1,0,0,0,0,0,+1,-1,+1,0,-1,+1,0,0,0,+1,-1,0,+1,-1,+1,-1,+1,-1,+1,0,0,0,-1,+1,+1,- 1,0,0,0,0,0,0,0,+1,-1,0,0,0,0,0,0,+1,-1,0,0,0,+1,-1,0,0,+1,-1,0,+1,-1,0,+1,0,0,- 1,+1,0,-1,+1,0,-1,+1,-1,+1,0,-1,+1,-1,0,+1,-1,+1,-1,0,+1,-1,0,+1,-1,0,0,0,0,0,-1,0,+1,-1,0,- 1,+1,0,-1,+1,-1,0,0,0,0,0,0,0,0,0,0,0,0,0,0,0,0,0,0,0,0,0,0,0 ) |
| | (this value shows the fluctuations from one delimited flow value to the next. It is most helpful in detecting water events that are running in parallel, and related spikes or drops) |
| Time of Day | (ex: Afternoon) |
| | (Time of Day can be helpful in assessing the "likelihood" that a water event was triggered by a particular end-user behaviors, consumption source, and or end-user) |
| Season (time of year) | (ex: September, Early Fall) |
| | (Time of Day can be helpful in assessing the "likelihood" that a water event was triggered by a particular end-user behaviors, consumption source, and or end-user) |
| Other | (preceding and/or concurrent or subsequent water events, climate data, other device or sensor data) |

Fig. 4

| Property Name: | Allowable Deviation Percentage |
|---|---|
| Duration | 0.05 |
| Pulse Count | 0.10 |
| Estimated Gallons | 0.00 |
| Mean Flow Data Value | 0.06 |
| Mode Flow Data Value | 0.06 |
| Median Flow Data Value | 0.06 |
| Max Flow Data Value | 0.00 |
| Min Flow Data Value | 0.00 |
| Base Flow Data String | 0.00 |
| Differential Flow Data String | 0.00 |
| Time of Day | 0.00 |
| Season (time of year) | 0.00 |

Fig. 5

SYSTEMS FOR AND METHODS OF MONITORING WATER CONSUMPTION

CROSS-REFERENCE TO RELATED APPLICATIONS

This application claims priority pursuant to 35 U.S.C. 119(e) to U.S. Provisional Patent Application Ser. No. 62/740,194, filed Oct. 2, 2018, the entire disclosure of which is incorporated herein by reference.

FIELD OF THE INVENTION

The present invention relates generally to a system for and method of monitoring water consumption. More specifically, the present invention is concerned with ascertaining and reporting information associated with specific water consumption events.

BACKGROUND

While water is abundant in many areas of the world, it is less abundant, and sometimes even scarce, in other areas. Even in areas where water is abundant, clean water is not always abundant. For instance, agricultural runoff and industrial wastes often decrease the quality of water, sometimes making water undrinkable or even unusable. Air pollution also contributes to water pollution through the constant cycle of evaporation and condensation causing more and more air pollutants to be collected in reservoirs, rivers, and other bodies of water.

There are many processes for cleaning contaminants from water, but these processes are time consuming and expensive. As pollution levels increase, the requirement for employing these processes increases and, in many cases, such processes become even more time consuming and even more expensive. Compounding this issue is the continued corresponding increases in industry, population, and commerce. For instance, population centers tend to grow where large industrial complexes present numerous job opportunities, thereby simultaneously increasing industrial and residential water usage. Similarly, commercial activity generally increases as population increases, thereby further increasing population and water usage. In each case, pollution in the area increases, thereby often decreasing the availability of clean water at the exact same time demand for clean water increases. In some cases, demand for water increases beyond availability of water, clean or otherwise. Consequently, it would be beneficial to have a system and method for decreasing water demand, such as by assisting individuals to conserve water.

Most individuals are aware that water shortages exist in at least some areas of the world. In some such areas, water flow is also vital for producing energy, for transportation, and/or for ensuring a vital ecosystem, often making it necessary to conserve water upstream and/or downstream. For those individuals living in such areas, conservation of water can be a matter of life or death and/or can be the difference between a thriving society and a suffering society. For other individuals, conserving water may be desired and/or necessary to satisfy personal goals, to comply with community regulations, to save money, and/or for any number of reasons. Companies also often desire to conserve water for similar reasons. Consequently, it would be beneficial to have a system and method for assisting individuals and companies in efforts to conserve water.

Unfortunately, it is difficult for users to understand whether their efforts to conserve water is effective. For instance, water companies only provide total water usage on a monthly basis. During any given month, a number of factors can affect water usage positively or negatively, often making it difficult or impossible for home users to know whether their conservation efforts are effective or counter-productive. In some circumstances, lack of accurate and timely information can be counter-productive for conservation efforts, often creating frustration associated with conservation efforts rather than creating motivation to implement and/or continue conservation efforts. Consequently, it would be beneficial to have a system for and methods of providing consumers with timely and precise information associated with water usage. Furthermore, it would be beneficial if the information was provided in such a way so as to motivate individuals and companies to implement and/or continue conservation efforts.

While conserving water is important, it is understood that use of water is necessary, especially for maintaining hydration and/or hygiene, failure of either potentially increasing health risks for an individual and/or a community. Consequently, it would be beneficial to have a system for and methods of monitoring and/or evaluating water usage so as to ascertain whether hydration and/or hygiene is being properly maintained.

Water usage can also be associated with one or more underlying issue ranging from personal health to problems with a plumbing fixture and/or issues with one or more appliance. Consequently, it would be beneficial to have a system for and methods of evaluating water usage so as to mitigate risks and/or to identify potential problems in time to implement preventative measures.

SUMMARY

The present invention comprises a system for and a method of monitoring water consumption. In some embodiments, the system is a non-invasive add-on to existing plumbing systems. In other embodiments, the system includes one or more flow meter or other device that is integrated into a plumbing system. In some embodiments, the plumbing system is a residential system, a commercial system, an industrial system, a recreational system, or the like.

In some embodiments, the system includes a sensor that is configured to secure to a flow meter and/or that is otherwise configured to be positioned in close proximity to a flow meter or other monitoring device of a plumbing system. In some embodiments, the sensor is configured to detect minor fluctuations in one or more field, such as one or more magnetic fields, one or more electric fields, one or more electromagnetic fields, and/or one or more other field or the like now known or later discovered (herein, each a "field") surrounding the monitoring device, each such minor fluctuation being attributable to one or more water event. In some embodiments, the present invention includes a method of positioning a sensor onto and/or otherwise positioning a sensor relative to a monitoring device of a plumbing system so as to optimize or otherwise enable the sensor's ability to detect field fluctuations.

In some embodiments, the system includes a processor for receiving field fluctuation information associated with the monitoring device. In some such embodiments, the processor is in data communication with one or more data storage device containing historical information associated with the monitoring device, such historical information relating to one or more water event previously recorded and/or predicted for the system. In some embodiments, each water event creates a unique fluctuation such that the system of the present invention is capable of determining the occurrence of a water event based on field fluctuation information associated with the water event (i.e. a "fingerprint" of the one or more water event).

In some embodiments, the system is configured to ascertain patterns, values, timing, and other information associated with each water event fingerprint. In some embodiments, the system is further configured to dissect field fluctuation information so as to obtain a plurality of associated contemporaneous and/or non-contemporaneous water event fingerprints. In some embodiments, the system is configured to aggregate information associated with two or more water event fingerprints so as to ascertain and/or predict an aggregate fingerprint and/or to otherwise more accurately classify one or more water event.

In some embodiments, the system is configured to receive and/or request information associated with one or more water event fingerprint, thereby allowing the system to acquire information for classifying water events. In some embodiments, the system is configured to classify one or more water event based on a type of fixture and/or appliance. In some embodiments, the system is configured to classify one or more water event based on a location and/or condition of one or more fixture and/or appliance. In some embodiments, the system is configured to classify a water event based on a person associated with the water event and/or based on whether the event is a common water event or an isolated or ad-hoc water event.

In some embodiments, the system is configured to compare a number of common water events so as to identify trends and/or other information associated with such events. In some embodiments, the system is configured to predict water events based on one or more trend. In some embodiments, the system is configured to identify anomalies associated with one or more water event. In some embodiments, the system is configured to provide information associated with one or more anomaly and/or to request information associated with the same. As a specific example, the system is configured to anticipate a hand washing water event following a toilet flushing water event. In some embodiments, the system is configured to provide an indication to a user when a hand washing water event does not correlate with a toilet flushing water event (thereby allowing employers to monitor employees and parents/teachers to monitor children). In some embodiments, the system is configured to identify an amount of time for a hand washing water event and to provide an indication to a user when the duration of such event is less than a predetermined time considered acceptable for such event.

In some embodiments, the system is configured to ascertain sequential and/or contemporary use of one or more fixture and/or appliance. For instance, in some embodiments the system is configured to ascertain a first water event associated with rinsing a toothbrush prior to a user brushing their teeth and a second water event associated with rinsing a toothbrush after the user brushes their teeth. In some embodiments, the system is configured to ascertain an amount of time associated with each water event and/or to ascertain an amount of time between each water event. In this way, the system is configured to ascertain whether water is being wasted (i.e. running water while a person is brushing their teeth) and/or whether a person is brushing their teeth for an appropriate amount of time and/or whether such person is properly rinsing their toothbrush before and after brushing their teeth (i.e. allowing parents to monitor children).

In some embodiments, the system is configured to distinguish between one or more water event and/or is configured to associate one or more water event with one or more other water event so as to increase probabilities associated with accurately classifying each event. In some embodiments, the system is configured to ascertain and/or predict minor possible deviations in water event fingerprints based on a prior use of a fixture or appliance associated with the water event, thereby increasing the accuracy of the classification of the water event. In some embodiments, the system is configured to analyze information associated with prior, subsequent, and/or contemporaneous water events (or the lack thereof) so as to increase the fidelity of the analysis of each water event fingerprint. In some embodiments, the system is configured to detect and/or predict sequential water events and/or other timing information associated with one or more water event.

In some embodiments, the system is configured to compare information associated with one or more water event with anticipated information for such water event. In this way, the system is capable of predicting potential issues with incoming water flow, individual fixture and/or appliance performance, and/or changes in habits associated with one or more user. In some embodiments, the system is configured to provide a warning associated with certain information, such as information suggesting that a fixture and/or appliance is faulty and/or mal-adjusted such that water consumption is increased or otherwise not idealized. In some embodiments, the system is configured to provide a user with water consumption information associated with such information so as to assist a user in determining whether a fixture should be replaced, adjusted, maintained, or left alone.

In some embodiments, the system provides information associated with one or more way to utilize a fixture and/or appliance so as to decrease water consumption associated with such fixture/appliance and/or to otherwise assist with improving water consumption in general. In some embodiments, the system is configured to receive feedback from one or more user, such as an individual using water and/or observing water consumption, such as information pertaining to one or more specific water event and/or one or more specific fixture/appliance (a "specified fixture"). In some such embodiments, the system is configured to provide information associated with one or more specified fixture, such as a real-time alert and/or a historical report.

In some embodiments, the system is configured to compare a plurality of water events so as to obtain potential risk and/or other information associated with such water events. In some such embodiments, the system is configured to provide a warning and/or guidance to one or more user based on their personal water usage, such as a hydration and/or hygiene warning associated with insufficient water usage and/or guidance associated with proper and/or more efficient water usage. In some embodiments, the system is configured to provide each user with a water consumption profile. In some embodiments, the system is configured to provide a water consumption profile associated with one or more appliance, thereby assisting users in better understanding water usage. In some embodiments, the system is configured to provide a comparison of water usage for one user/fixture/appliance with another user/fixture/appliance. In some embodiments, the system is configured to provide a use and/or improvement score for one or more user/fixture/ appliance, thereby providing motivation and/or guidance for conserving water. In some embodiments, the system is configured to associate a dollar value with one or more user, fixture, and/or appliance over one or more period of time and/or associated with one or more water event. In some embodiments, the system is configured to compare water savings with acquisition costs for a new fixture/appliance. In some embodiments, the system is configured to provide a notification when such savings exceed such acquisition costs.

In some embodiments, the system is configured to analyze isolated water events so as to ascertain information associated with such isolated water events, such as whether such isolated water events have a predictable impact on one or more other water event. In some embodiments, the system is configured to prompt one or more user to provide information for one or more isolated water event, such as to classify such event by person, fixture, appliance, or otherwise. In some embodiments, the system is configured to adjust existing predictability parameters, such as reliability factors, based on information associated with one or more isolated water event and/or associated with deviations in one or more common water event.

In some embodiments, the system is configured to analyze information so as to ascertain potential problems and/or risks. In some embodiments, the system is configured to identify potential water leaks, potential frozen pipes, potential underperforming fixtures and/or appliances, and/or one or more other problems requiring maintenance of one or more pipe, fixture, and/or appliance. In some embodiments, the system is configured to report potential risks to one or more user. In some embodiments, the system is configured to provide an indication of a risk level, recommended timing for addressing such potential risks, and/or anticipated water loss and/or other potential adverse effects associated with such risks.

In some embodiments, the system includes an "away mode" associated with times of anticipated low or zero water usage. In some embodiments, the "away mode" enables users to identify recurring "away" periods (i.e. work/school schedules) and/or intermittent "away" periods (i.e. vacation/work trip/holiday schedules). In some embodiments, the system associates one or more threshold value with one or more away period. In some embodiments, the system is configured to provide an alert to a third party, such as a landlord, a custodian, maintenance personnel, a neighbor, or the like if water usage exceeds a first threshold value during an away period. In some embodiments, the system is configured to provide an alert and/or one or more other notification to a property owner and/or one or more other person or entity regarding an alert being sent to such third party, thereby providing an opportunity to follow-up with such third party, such as by verifying that such third party has taken appropriate action and/or for instructing such third party regarding what action to take, if any.

In some embodiments, the system is configured to notify one or more person of an unplanned and/or unexpected water event, such as an event associated with a water leak, an excessively long shower, a broken fixture and/or appliance, or the like. In some embodiments, the system is configured to shut off water to the water system if water usage exceeds a threshold value, such as a standard threshold value and/or one or more away threshold value.

In some embodiments, the system is configured to associate a reliability factor with one or more classification of a water event. In some embodiments, reliability factors and/or one or more other factor and/or parameter is used to assist the system predict one or more classification for one or more water event. In some embodiments, the system is configured to receive user feedback associated with one or more water event, such as during a learning and/or adjusting phase, thereby providing the system with a basis for determining a reliability factor. In some embodiments, the system includes recommendations for adding one or more feature to one or more fixture/appliance (and/or otherwise in association with the same) so as to assist in distinguishing one or more fixture/appliance from one or more other fixture/appliance. In some embodiments, the feature is an aerator, an elbow, a reducer, and/or one or more other feature now known or later developed that is capable of assisting the system in distinguishing between two or more fixtures/appliances, such as by causing measurable distinctions in respective fingerprints.

In some embodiments, the system is configured to prompt a user to provide information, such as classification information for one or more water event. In some embodiments, the system is configured to prompt a user to validate a classification for a water event and/or to otherwise receive information associated with the accuracy of one or more classification of a water event. In this way, the system is configured to increase the reliability of its reliability factors. In some embodiments, the system is configured to decrease a reliability factor based on an inaccurate classification and/or to increase a reliability factor based on an accurate/validated classification. In some embodiments, the system is configured to provide a user with an indication of a reliability of a classification for one or more water event, thereby providing the user with an indication of the reliability of the system in general and/or the classification specifically.

The present invention further includes a method of configuring a system using a training, adjustment, and/or verification protocol (each a "training protocol"). In some embodiments, the training protocol includes prompting a user to perform one or more water event at a prescribed time and/or for a prescribed amount of time. In some embodiments, the prompt is provided by a user device, such as a computer, a mobile device, and/or one or more other device now known or later developed. In some methods, the user device is configured to provide one or more interface function and/or feature, such as a graphic user interface, thereby allowing the user to provide information to the system and/or to receive information from the system. In some embodiments, a training protocol prompts a user to classify one or more water event and/or prompts a user to verify one or more classification of a water event.

In some embodiments, information associated with one or more training protocol is stored in one or more data storage device. In some embodiments, information is assessed and classified as reliable or unreliable. In some embodiments, only reliable information is stored in the data storage device. In some information, unreliable information is stored in one or more data storage device, but such information is tagged or otherwise classified as being unreliable. In some embodiments, classification information is associated with a reliability factor, thereby providing the system with a means of determining how to weigh such information. In some embodiments, reliability factors associated with information is updated upon receiving validation information associated with unreliable information and/or upon receiving an indication suggesting that reliable information has become less reliable.

In some embodiments, one or more training protocol is utilized to ascertain one or more water event fingerprint and/or to ascertain acceptable fluctuations associated with one or more water event fingerprint. In some embodiments, one or more training protocol includes associating one or more water event fingerprint with one or more water event, such as a toilet flush, a filling cycle (such as for an ice machine, a washing machine, or the like), use of a sink (such as for washing hands, brushing teeth, cleaning dishes, cleaning food, or the like), use of a shower and/or bath (such as for personal bathing and/or for bathing a pet), and/or any other use of water common in homes, businesses, or elsewhere, such as outdoor uses, including sprinkler systems, irrigation systems, and the like. In some embodiments, one or more water event fingerprint is associated with one or more user, fixture, appliance, and/or otherwise classified so as to assist a user in determining the accuracy of the classification and/or determining water consumption associated with such user, fixture appliance, or otherwise.

In some embodiments, the system utilizes information from one system to assist in ascertaining data for a second system. In some embodiments, the system utilizes data from a plurality of systems to establish a predictability table associated with common water events and/or with common fixtures/appliances associated with common water events. In some embodiments, the system utilizes information from a first system and/or from a first database to ascertain predictability information associated with a second system. In some embodiments, the system is configured to control and/or indirectly influence or inform control mechanisms that trigger or manage one or more water events, (i.e. lawn watering, washing machines, shower availability, toilet flushing, or the like) associated with a plurality of water systems, thereby assisting in conserving water on a larger scale and/or assisting in preserving system reliability, such as by maintaining minimum volume, flow, and/or pressure requirements. In some embodiments, the system is configured to compare flow information of one or more water systems with demand-side water information, thereby assisting in determining times of increased demand, times of decreased demand, and/or potential issues associated with a demand-side system. In some embodiments, the system is configured to identify one or more water leak associated with a demand-side system, such as by comparing aggregated consumer-side information with contemporaneous demand-side information.

The present invention includes a method of obtaining and/or creating historical information for use in obtaining and/or determining reliability of one or more classification. In some embodiments, the method includes performing one or more training event. In some embodiments, the system includes obtaining information associated with one or more water system, such as piping dimensions, pipe routing, location of one or more fixture and/or appliance, specifications associated with one or more fixture and/or appliance, condition of piping, fixtures, and/or appliances, incoming water pressure, fluctuations associated with incoming water pressure, and/or one any other pertinent information now known or later discovered.

In some embodiments, information from one or more sensor is communicated to one or more central processor for analysis and classification. In some embodiments, information is then communicated to and/or made available to one or more user, such as through a user interface. In some embodiments, the system is configured to provide a usage report and/or conservation assessment, such as by providing one or more table, chart, graph, or the like. In some embodiments, the system is configured to receive information back from a user and/or is configured to prompt a user to provide information regarding the accuracy of such information. In some embodiments, the report includes chronological information, classification information, reliability information, and/or one or more other type of information for assisting a user in ascertaining the usefulness of the information and/or the impact of one or more water consumption decision.

In some embodiments, the system includes a control system for controlling water flow, such as a control system for controlling water flow to a sprinkler system. In some embodiments, the control system is configured to obtain information from one or more third party, such as a weather channel and/or a rain fall entry, so as to determine an appropriate time to initiate a water event and/or to assist in determining an appropriate duration for such water event. In some embodiments, the system includes one or more sensor, input mechanism, or the like for obtaining and/or predicting weather information.

In some embodiments, the system includes an alert system. In some embodiments, the alert system alerts one or more user when an unknown water event is detected and/or when a trigger value is detected. In some embodiments, a trigger value is associated with a maximum allowed shower time, a minimum required hand washing time, a failure to shut off water while brushing teeth, and/or one or more other event for which water consumption habits could be improved.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 4 is a visual representation of a print-out indicating certain data points associated with a fingerprint of an embodiment of the present invention.

FIG. 5 is a visual representation of a print-out indicating certain allowable deviation percentages associated with a matching algorithm of an embodiment of the present invention.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
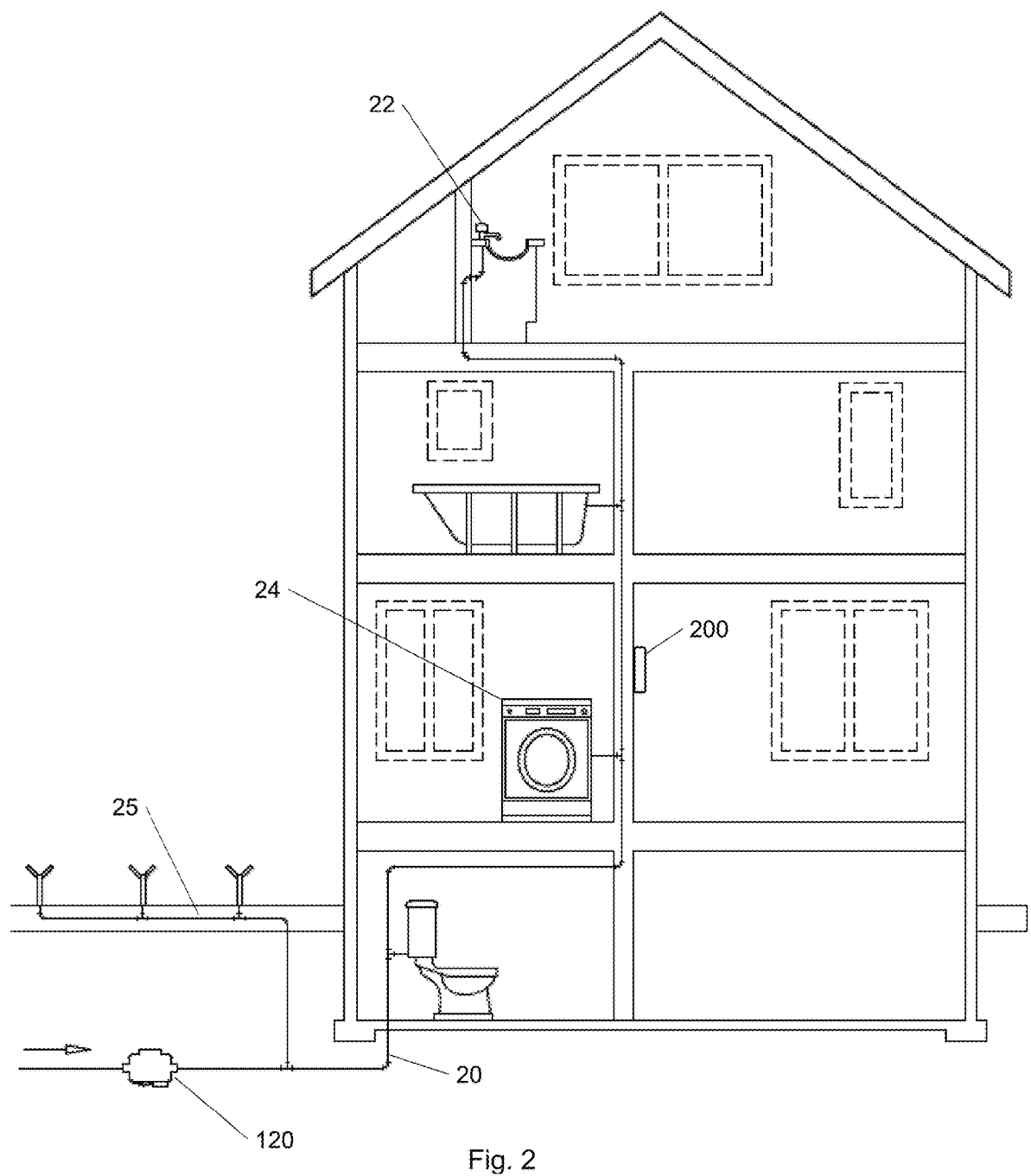
FIG. 2 shows a representation of first and second plumbing systems associated with certain implementations of the systems and methods of the present invention.
Figure 3:
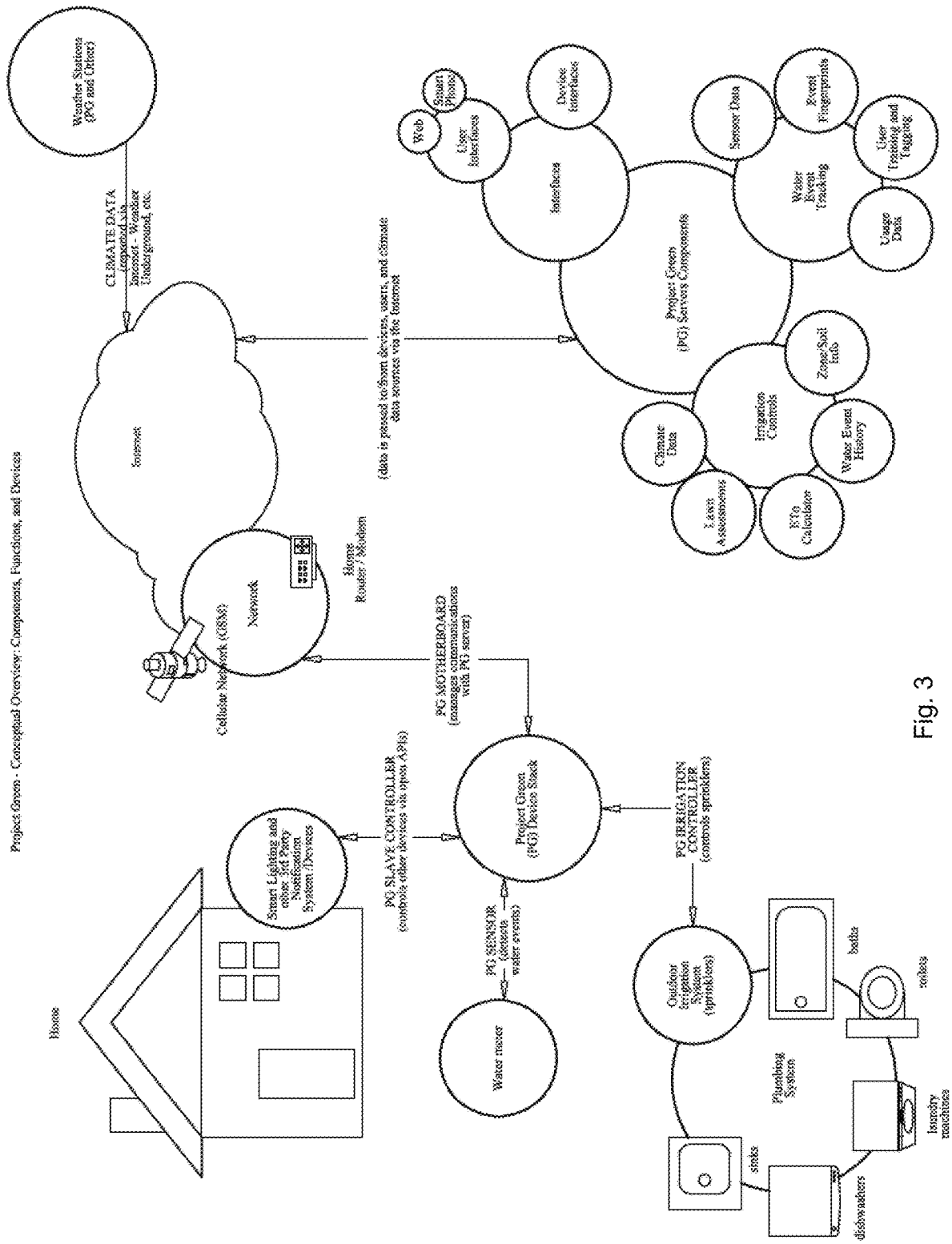
FIG. 3 provides a visual representation of certain aspects of the systems and methods of the present invention.

Referring to FIG. 2, some embodiments of the present invention comprise a monitoring system for monitoring water usage of one or more water system, such as a first 20 and/or second 25 water system. In some embodiments, the first water system 20 is a residential water system comprising one or more water fixture 22 and/or one or more water appliance 24. In some embodiments, the one or more water fixture 22 is a sink faucet, a bath faucet, a shower head, a toilet, an exterior faucet, or the like. In some embodiments, the one or more water appliance 24 is a dishwasher, a laundry machine, an ice maker, or the like. In some embodiments, the first water system 20 comprises one or more sprinkler. In some embodiments, the second water system 25 is a sprinkler system. In still other embodiments, the first and/or second water system is an agricultural water system, an architectural and/or decorative water system, an industrial water system, a commercial water system, a recreational water system, and/or one or more other water system now known or later developed.

Figure 1:
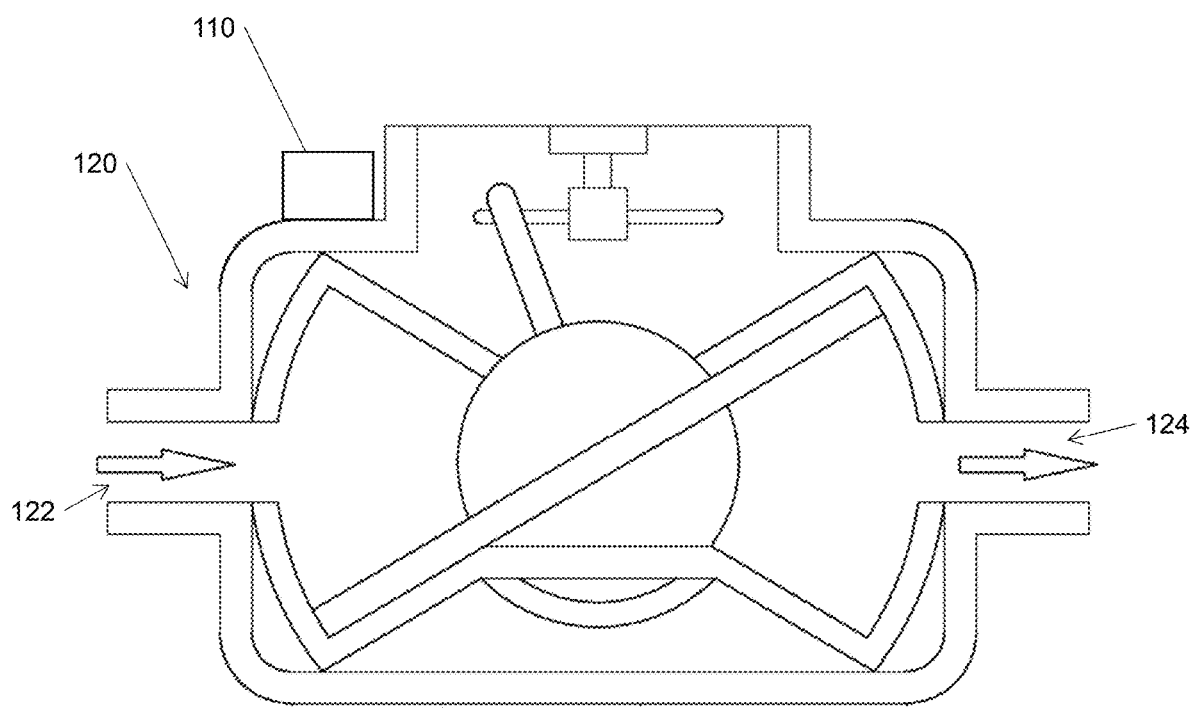
FIG. 1 shows a sectional view of a sensor affixed to a flow meter.

Referring to FIG. 1, some embodiments of the monitoring system comprise a sensor 110 for detecting a first value associated with a real-time flow rate through one or more water system, such as the first and/or second water systems of FIG. 2. In some embodiments, the sensor 110 is configured to receive information from one or more flow meter 120. In some embodiments, the flow meter includes a housing having an inlet 122, an outlet 124, and an inner cavity positioned therebetween such that fluid flowing from the inlet 122 to the outlet 124 must flow through the inner cavity. The flow meter 120 comprises a means of measuring a volume of fluid flowing through the flow meter. In some embodiments, the flow meter 120 includes a nutating disk system or one or more other means of measuring a volume of fluid flow (herein, each a "measuring device"). In some embodiments, the measuring device is positioned at least partially within the inner cavity of the flow meter.

In some embodiments, the measuring device is configured to move while water is flowing through the flow meter, thereby providing an indication of a quantity and/or a rate of flow through the flow meter. In some embodiments, movement of the measuring device creates and/or interferes with a field surrounding the flow meter. In some embodiments, properties of a created field and/or fluctuations associated with interference of an existing field (herein, either scenario being referred to as a "fluctuation" and/or a "field fluctuation") correlate with movement of the measuring device such that field fluctuations correlate with fluid flow through the flow meter.

In some embodiments, the sensor 110 is configured to sense field fluctuations. In some embodiments, the sensor 110 includes a magnetometer, a hall-effect sensor, or any other sensor now known or later developed that is capable of detecting a field and fluctuations thereof. In some embodiments, the system is configured to correlate one or more field fluctuation with one or more discrete event, such as one or more discrete water event and/or one or more discrete water loss event (each being a "water event"). In some embodiments, a water event is any passage of water through a plumbing system, fixture, and/or any component of a water delivery and/or water-use system, including but not limited to residential and commercial plumbing and irrigation systems. In some embodiments, the sensed field fluctuation is attributable to a minor change in water pressure and/or water flow rate associated with one or more discrete event.

In a particular embodiment of the present invention, the system includes a sensor 110 coupled to a top portion of a flow meter 120. The sensor 110 is configured to detect fluctuations in fields associated with water flowing through the flow meter. In some embodiments, In some embodiments, the system includes a processor 200 in data communication with the sensor 110, such as through one or more wired or wireless communication means. In some embodiments, the processor is in data communication with a server, includes a keypad and/or display monitor, and/or is configured to otherwise provide information to and/or receive information from one or other user or system of the invention or otherwise. In some embodiments, the processor 200 is configured to calculate one or more packets of processed information from one or more signal (i.e. signal received from the sensor 110), message (i.e. information received from the server), input (i.e. information received from a user), or the like.

In some embodiments, the processor includes one or more antenna 202 for facilitating communication with one or more sensor 110, wireless router, or the like. In this way, the processor is capable of receiving information wirelessly, such as from one or more sensor 110 and/or send information wirelessly, such as to one or more wireless router or the like. In some embodiments, the processor 200 includes one or more means of storing information locally, such as via a thumb drive 205 or the like. In some embodiments, the means of storing information locally is hardwired into the processor while in other embodiments the means of storing information locally is configured to selectively engage with the processor, thereby facilitating removal of the same.

The present invention further comprises a method of monitoring water consumption by detecting field fluctuations associated with a flow meter. In some embodiments, the method includes a training protocol in which field fluctuations are detected and later associated with one or more water event. In this way, the system is configured to ascertain a "fingerprint" for each of a plurality of water events.

A fingerprint is a set of values derived from and characterizing sensed, physical properties associated with a water event. In some embodiments, fingerprints are combined with or otherwise associated with more global and generic information and metadata collected and aggregated in relation to or coinciding with the water event, an associated water delivery system, associated uses of the system, associated users of the system (and their known and/or predictable behaviors), third-party information (i.e. information received from third party sensors, systems, or other information sources), extenuating circumstances (i.e.—time of day, season of the year, geographic locale, climate/weather data, end-user demographics, plumbing and irrigation system configurations and settings, other information voluntarily input by end users, other associated systems, and/or support personnel, Wi-Fi and other proximity/location sensors, point-to-point networks and communication devices, smart home hubs and platforms, etc.), and the like.

In some embodiments, a first fingerprint is associated with a single water event and a second fingerprint is associated with a composite water event ("composite fingerprint"). In some embodiments, a composite water event is an aggregate of two or more water events that correspond to and/or map to a more comprehensive end-use and/or end-user-behavior. In some embodiments, the system is configured to recognize, categorize, and/or otherwise determine sequential and/or simultaneous water events associated with one or more composite fingerprints.

In some embodiments, a composite fingerprint consists of aggregating a plurality of individual fingerprints occurring. For example, a single "load" or "run" of a clothes or dishwasher may consist of several sequential water events, each representing one of the stages or sub-cycles of the complete wash cycle for a single "load". Similarly, the water used at a sink to brush someone's teeth may consist of multiple end-user actions at the sink faucet to wet the toothbrush and rinse the mouth, resulting in the sink being turned on/off multiple times.

In some embodiments, the system is configured to assess a fluctuation of a first fingerprint for a first water event due to the occurrence of a corresponding second water event, thereby identifying a composite fingerprint. For example, in some embodiments, the system is configured to identify a first fingerprint associated with refilling a toilet tank after the toilet has been flushed and is further configured to identify a first composite fingerprint associated with a faucet running for washing hands. In some embodiments, the system is configured to predict the occurrence of a second water event following (or occurring during) a first water event, thereby increasing reliability of the same.

In some embodiments, the system is configured to distinguish a first individual water event from a second simultaneous water event, regardless of whether the first and second water events are related. In some embodiments, an unrelated-overlapping water events is a water event that, through happenstance or coincidence, runs in parallel to and/or overlaps with another water event, or set of water events, that is/are derived from separate and/or unrelated end-uses and/or end-user-behaviors, sources, or system actions. In some embodiments, overlapping water events are not viewed as or combined to represent a composite water event (or composite fingerprint). In some embodiments, water events are classified as overlapping water events upon the system determining that the water events have no real conceptual relation to one another despite transpiring at or around the same time. For example, some embodiments of the system are configured to categorize a shower that runs at the same time as a sprinkling system line and/or dishwasher as overlapping water events. In some embodiments, the system is configured to compare a plurality of unrelated water events (and/or to obtain input from a user associated with the system) so as to ascertain the accuracy of such classifications and/or to determine whether sufficient information exists to create and/or justify creation of a composite fingerprint, to identify a system or global trend, to identify a behavior, or the like.

In some embodiments, the system is configured to classify one or more water event, such as through a "water-event identification" process or the like. In some embodiments, water-event identification is the process through which the system labels and categorizes water events. In some instances, the system can auto-identify a water event based on its fingerprint, other historical data about other verified events, and/or other information collected by and/or persisted in the system from other fixtures and or households or businesses. In some instances, the system utilizes input from a user and or one or more external systems to help identify (and/or to identify to a higher degree of confidence) a water event and/or a source associated therewith.

In some embodiments, the system is configured to assign one or more reliability factor to one or more water event. In some embodiments, reliability factors are based on and/or otherwise associated with whether such events are identified through "positive" matching or "negative" matching.

In some embodiments, a positive matching identification is determined when one or more measured field fluctuation matches or, based on one or more probability factor, otherwise closely resembles one or more known individual and/or composite fingerprint. In some embodiments, a negative matching identification is based on probability when positive matching identification is not possible and/or is impractical. In some embodiments, a negative matching process includes determining that measured fluctuations do not match (or sufficiently resemble) any known individual and/or composite fingerprints and determining probabilities associated with known and unknown events.

In some embodiments, known events include known water events, known supply-side fluctuations, known demand-side issues, and the like, regardless of whether such events are associated with a fingerprint. In some embodiments, positive matching identification is possible upon receiving sufficient confirmation of negative matching identifications associated with one or more known event. In some embodiments, unknown events include unknown supply-side fluctuations and/or demand-side issues. In some embodiments, supply-side fluctuations associated with negative matching include unexpected increases or decreases in water pressure and/or flow. In some embodiments, demand-side issues include leaks, breaks, mal-adjusted fixtures, and the like. In some embodiments, the system includes a verification process in which a user is prompted to verify or otherwise classify an unknown or unidentified event.

In some embodiments, the system is configured to develop one or more water usage report, notification, or the like. In some embodiments, system notifications include messages, triggered events, signals, or the like. In some embodiments, system notifications include information about a specific water event's nature, characteristics, progress, efficiency, budgetary progress as a single event or as part of a larger aggregate, or the like. Common notification types include, but are not limited to, Smart Phone Application "Push" Notifications, Banners and/or Messages displayed on any system user interfaces like Intranet and Extranets systems, Device LCDs and or embedded screens, email messages, SMS/text messages, "Smart" lighting manipulations/adjustments, Other third party "smart" devices and/or platforms, PDF Reports, Other Data Dumps, Intra-System Communicated APIs and Messaging Platforms, and the like.

In some embodiments, the system is configured to provide a conservation assessment, such as an assessment as to whether water usage complies with goals and/or regulations. In some embodiments, the system is configured to provide tips for assisting users conserve water.

In some embodiments, the system uses a set of custom circuit boards, electronic components, and sensors to detect, measure, and differentiate water events from one another. In some embodiments, physical properties and characteristics inherent to a measured water event include, but are not limited to, its Start Time, End Time, Volume, and Flow Pattern or Cadence.

In some embodiments, a Start Time of a water event marks the moment that the flow rate increases from zero to a higher-rate-of-flow, as water passes through the plumbing, irrigation, or other water delivery system. In the case of concurrent and/or overlapping water events, the Start Time of an additional event is marked and detected as the moment the flow rate increases from a static or consistent baseline flow rate to an increased flow rate (i.e.—since another water event is already running at an established "baseline" flow rate when an overlapping event begins, the initial spike and increase in flow due to the second event's flow marks the beginning of that event and thereby its Start Time).

In some embodiments, an End Time of a water event marks the moment that the flow rate decrease to zero from a higher-rate-of-flow, as water slows and/or ceases to flow through the plumbing, irrigation, or other water delivery system. In the case of concurrent and/or overlapping water events, the End Time of an event is marked and detected as the moment the flow rate decreases from a static or consistent baseline increased flow rate to a decreased flow rate.

In some embodiments, a Volume of a water event is the amount of water, measured in cubic units, that flows through the plumbing, irrigation, or other water delivery system during a period of time denoted by and falling between the water event's Start Time and End Time.

In some embodiments, a Flow Pattern or Cadence of a water event is a measure of the flow rate and/or fluctuations in the flow rate over time and during the life of a water event, specifically the flow rate and fluctuations occurring between the event's Start Time and End Time. The Flow Pattern or Cadence of a water event can be sensed and/or measured using various methods. In some embodiments, the flow Pattern and/or Cadence is a direct result of, and is inherent to, the physical forces, characteristics, and properties in-play as water flows through the various meters, pipes, couplers, fittings, fixtures, and other components of a plumbing, irrigation, or other water delivery system. In some embodiments, these physical forces include all (or at least some) of those inherent to fluid dynamics, including but not limited to, friction (pipe roughness, fittings and bends, etc.), gravity (relative elevation changes and or drop and rise), main-line feed pressure, etc. that impact and influence water's flow through pipework, fixtures, fittings, and the like.

In some embodiments, the system of the present invention is configured to work with water delivery systems having an in-line Positive Displacement Flow Meter. In some such embodiments, the sensing and measuring function described herein can be achieved quickly and non-invasively. For instance, in some embodiments, the cadence of the water's flow through the delivery system can be sensed and measured by affixing, to the outside of the meter, a magnetometer and/or any other sensor capable of detecting the presence, strength, and fluctuations in the magnetic field occurring in and around the meter. In some embodiments, a single and centralized sensor is the only sensor required for collecting and sensing primary data and information about events occurring all throughout the entire plumbing, irrigation, or other water delivery system.

In some embodiments, the detection of a water event's Start Time, End Time, and Flow Pattern or Cadence are most commonly achieved through the implementation of a sensing strategy that revolved around a "No Pulse Window" and "Sampling Cycle":

In some embodiments, a No Pulse Window ("NPW") is utilized, such as by a tracker device of the system, to assist in determining when a water event starts and stops. In some embodiments, the system determines a start time for a new water event upon detecting a first pulse or other initial indication of water flow. In some such embodiments, the system denotes/stamps the occurrence and start time of a new water event. In a specific scenario where NPW equals 5 seconds, the new water event is considered to be running/active until a period of no-pulses (or other flow indications) measuring 5 seconds or more in duration passes. In some embodiments, an NPW or similar concept is utilized for measuring flow fluctuations, such as from a first baseline to a second baseline associated with aggregate or unrelated events. In some embodiments, the value of an NPW can be adjusted on the fly when necessary by sending new configuration data from a server to a measuring device of the system.

In some embodiments, a Sampling Cycle denotes the sampling rate that a sensor board uses to monitor a field, such as a magnetic field. In some embodiments, the system's firmware setting/sensitivity is equal to 1 hz. In some embodiments, the Sampling Cycle is hardcoded into the board's firmware. In some embodiments, Sampling Cycle can be adjusted on the fly without requiring a new version of firmware be flashed to the device.

In some embodiments, the present invention includes a calibration process and a system that is configured so as to enable calibration. In some embodiments, the calibration process is conducted after a sensor of the system is affixed to a water meter or other feature of the plumbing system. In some embodiments, the calibration process includes setting a sensitivity of the system (i.e. the sensor, the firmware, and the like) by setting an "observable range" for which the system is configured to sense or otherwise detect field fluctuations, thereby establishing sensitivity associated with detection of fluid flow. In some embodiments, the process includes providing an indication to the system, such as by pressing a button on a sensor board, during one or more low-volume and/or high-volume water events. In some embodiments, a low-volume water event is associated with an ice machine, a sink faucet, a leaking toilet, a dripping faucet, or the like. In some embodiments, the high-volume event includes at least one of flowing water through one or more bathtub fixture, shower, toilet, washing machine, sprinkler system, or the like. In this way, the system is capable of setting minimum and maximum ranges for detecting field fluctuations.

In some embodiments, the present invention includes a data collection and calculation process and a system for collecting and calculating data. In some embodiments, the system aggregates, calculates, and persists both primary and secondary data.

In some embodiments, primary data is the information collected directly from and via the electronic circuit boards, sensors, user interfaces, and other points of data collection that are within the direct domain and control of the system. In some embodiments, such data includes water event start/end times, water event flow pattern or cadence data, names/types/descriptions/physical locations of water fixtures, names and other demographic data of individuals that use/run fixtures and/or devices comprising or drawing—from the water delivery system, and the like.

In some embodiments, secondary data is the information collected from third party devices, systems, databases, and/or other information sources that is complementary to tracked water events and/or is used in a decisioning process the system follows in reaction to, in anticipation of, or in direct orchestration and/or the scheduling of future water events. In some embodiments, secondary data includes, but is not limited to, things like historical and forecasted climate data, water fixture manufacturer ratings/specs/details, data collected and exposed by other smart home systems and/or hubs and any other connected devices, pricing information from water delivery authorities, historical usage and consumption data from water delivery authorities, and the like. In some embodiments, secondary data can be used in the matching/identification of water events, the notification of end users about water events, and/or the decisioning and/or downstream triggering of functions related-to or subsequent to water events.

In some embodiments, the data the system collects is saved on local storage devices (RAM, ROM, SD Card, USB Stick) and/or remote storage media and devices (Server File Systems, Structured Databases, Structured Storage "buckets" and content networks, etc.). In some embodiments, data communications between system components occur locally through direct connections like cables and LAN networks, as well as remotely via Internet and WAN connections provided by ISPs, Cellular providers, and the like.

In some embodiments, the present invention includes a process of and system for fingerprinting water events. In some embodiments, fingerprinting is accomplished by extrapolating and parsing the data into additional data points that make it more readily available for comparison to other water events via matching algorithms. In some embodiments, an aggregate of the instance values calculated and logged for each of the data points for a single water event can be referred to as its "Fingerprint" or "Signature". Similarly, the aggregate of all the data points averaged across an entire collection of "like/same" water events originating from the same fixture and/or fixture group and/or consumption activity can be combined and/or averaged to comprise its "Matching Fingerprint"/"Matching Signature" or "Comparison Fingerprint"/"Comparison Signature".

In some embodiments, a number of data points collected and tracked by the system and/or that comprise one or more fingerprint may vary depending on the implementation. In some embodiments, primary data gathered through direct sensor technology weighs very heavily into the calculation and/or reliability of a fingerprint. In some embodiments, information directly associated with a fingerprint is supplemented with information collected from other primary and secondary data sources and data points pertaining to end user consumption habits, demographics, fixture types and uses, season, time of day, and the like.

In some embodiments, the present invention includes a process of and system for identifying water events based on fingerprint information, such as by identifying a "source" and/or "cause" of a water event based on measured field fluctuations, and thereby matching the same.

In some embodiments, identifying a water event includes tagging-it-with and/or relating-it-to a water fixture and/or water fixture type and/or consumption activity and/or end user responsible for and/or other information that categorizes the water event and/or identifies (or at least assists with identifying) its source. In some embodiments, users can manually identify a water event, and/or the system can "auto-identify" water events once it has a baseline dataset of "known" fingerprints with which to work.

In some embodiments, identification relies on various system functions and algorithms that compare an unidentified event, or an event requiring re-evaluation, to an existing set of "known" and/or to a more "global average set" of "validated/trained" fingerprints, in an effort to find and rank closest and/or most probable match/matches. In some embodiments, "Validation" and "Training" consists of allowing end users and/or other systems that have knowledge about the source or cause of a water event to tag that information to an event making it "known", and thus adding it to a collection or pool of fingerprints and water events that are used as the baseline for comparisons and matching. The greater the number of verified or trained events in the dataset, the more statistically probable it is that the system can accurately "auto-identify" similar or like water events originating at the same fixture and/or for the same or similar consumption behavior and/or end user.

In some embodiments, the identification and matching process is iterative in nature. In some embodiments, the system "learns" as the dataset available to the matching algorithm increases in size and precision. In some embodiments, as the system continues to learn, previously-identified water events are re-evaluated under certain circumstances to enhance, extend, or change the list of characteristics and/or data entities with which it has been tagged. For example, in some embodiments, a water event initially identified as a "toilet flush" can be re-analyzed after a large enough data population for each of the different toilets in a house exists, so that the specific toilet responsible for each event can be identified (i.e.—"master bath toilet" vs. "guest bath toilet"). Similarly, in some embodiments, a re-evaluation is triggered to run if an additional toilet is added to the plumbing system in a new bathroom. In some embodiments, an identification process is run again after a leak or other issue is detected so that the data can be adjusted to account for and/or remove the "noise" or "data skew" caused by the leak. In some embodiments, detected noise and/or data skew is utilized in detecting the leak.

In some embodiments, the present invention includes a process of and system for identifying common "sources" or "causes" of water events and tagging the information accordingly. In some embodiments, such sources and causes include fixture type, fixture, end-use, end-user, leaks, breaks, physical locations within the system, and the like. In some cases, water events are identified prior to their completion, depending on the duration of the event and/or the system's configuration and one of any notification threshold settings pre-established for a particular household and/or fixture and/or fixture type and/or use.

In some embodiments, the process and/or system includes identifying, calculating, and/or validating allowable deviation percentages (Reference FIG. 5) for use when trying to associate measured fluctuations with known fingerprints. In this way, the system is configured to assess how a newly identified water event should be classified based on known fingerprints and established allowable deviations. In some embodiments, the system is configured to identify overlapping ranges based on various fingerprints and associated allowable deviations and/or is configured to eliminate or otherwise reduce misidentification of water events by adjusting allowable deviations to eliminate or otherwise reduce overlapping ranges.

In some embodiments, the system is configured to break composite fingerprints (associated with more than one water event occurring simultaneously) into underlying fingerprints, thereby assisting in the identification of each underlying water event. In some embodiments, the system first determines whether the composite fingerprint matches a known fingerprint and/or can otherwise be associated with one or more known water event and/or combination of water events. In some such embodiments, the system identifies water flow fluctuations, such as spikes and dips, to assist in the identification of associated water events. In some embodiments, the system compares measured fluctuations with patterns of known water events and/or fingerprints, thereby assisting in the identification of each water event. In some embodiments, identification of one or more water event includes finding patterns that fall within acceptable deviation ranges for known water events.

In some embodiments, the system derives baseline consumption figures over time for various fixtures, homes, buildings, consumption behaviors, users, and/or the like. In some embodiments, the baseline figures are used to set and monitor a budget for a particular category or classification of water event. In some embodiments, budgets are organized by source, such as by fixture, by fixture type, or the like. In some embodiments, each budget is associated with consumption activity over a specified period of time, such as a billing cycle, a season, or the like.

In some embodiment, the system measures, tracks, and/or estimates an amount of water wasted or derived from a leak, break, mal-adjusted fixture, or the like and further derives a cost associated therewith. In some embodiments, the system generates a reports and/or recommendations about faulty fixtures and/or recommendations about system modifications that would be made to save water and money. In many cases, a return-on investment (ROI) specific to a fixture and/or household's pattern of use is estimated and/or tracked and reported. In some embodiments, ROI estimates are calculated prior to investing in improvements or otherwise making changes to a system and/or habits, thereby assisting in the decision-making process and/or for providing motivation to reduce water consumption. In some embodiments, ROI estimates and tracking occur after improvements are made and/or changes are made to systems and/or habits, thereby providing real-world verification of water consumption improvements and/or motivation to continue reducing water consumption.

In some embodiments, the system is configured to measure, track, and or estimate the cost and amount of water wasted or derived from a leak, break, and/or mal-adjusted fixture. In some embodiments, once the duration, volume, timing, cadence, and/or source of the water event are identified, the system performs any number of subsequent steps or functions to update water budget figures, to notify users, to trigger other forms of automation or decisioning, and/or the like. In some embodiments, the system is configured to indicate a faulty or mal-adjusted fixture, a leak, a break, or any other uncommon or non-baseline occurrence in a plumbing and/or water delivery system, thereby providing a user with advance warning of the same.

In some embodiments, integrated third-party lighting systems, email systems, text messaging (SMS) systems, etc. are used to accomplish real-time notifications at the termination—of one or more water event and/or during the course of a "longer running", "high volume", or otherwise "noteworthy" water event. For example, in some embodiments, the system triggers an alert, notification, or the like if a water event, such as a shower, is longer than a pre-configured and/or default length of time and/or if the water event reaches a pre-configured or default water volume benchmark. In some embodiments, the alert and/or notification includes changing a status of one or more light or other indication feature, such as by causing one or more light to turn on, turn off, blink, change color, or the like, thereby creating a visual alert of excessive water consumption and/or otherwise providing an indication associated with water usage. In some embodiments the indication mechanism is positioned within a house or other building. In some embodiments, the indication mechanism is positioned adjacent to a shower so as to provide real-time information to a person while they are taking a shower. In some embodiments, the indication mechanism is positioned away from a fixture, such as in a living room, bedroom, or other room of the house, thereby enabling a first individual to quickly and easily obtain real-time information regarding water usage and/or waste associated with one or more fixture, system, other individual, or the like. In some embodiments, the system is configured to send a push notification, such as to a smart phone app or the like, thereby enabling a user to monitor real-time water usage even while away.

In some embodiments, the system is designed to and can be integrated into other smart home and/or automated control systems. In some embodiments, lighting systems, apps, or other indication mechanisms are used to signal leaks, breaks, underperforming fixtures or the like. In some embodiments, one or more indication mechanism is used to indicate budget progress and/or a rank, such as in a side-by-side conservation competition or the like. In some embodiments, data is aggregated across households, buildings, or the like to arrive at more global and/or generic figures for estimating and/or budgeting on behalf of water delivery authorities and/or other stakeholders. In some embodiments, the system includes and/or assists in facilitating large scale water consumption tracking, such as for determining water usage of a street, neighborhood, city, region, state, or the like, such as for large scale competitions. In some embodiments, the system is configured to provide status of each consumer's progress or placing in one or more competition. In some embodiments, the system is configured to optimize positive reinforcement for continuing to conserve water, such as for assisting with providing positive behavioral reinforcement (i.e. water consumption rebates for competition winners).

In some embodiments, the system is configured to provide micro-level and/or individualized reporting, such as by providing information directly to end users. In some embodiments, individualized information is benchmarked against or otherwise compared with other users of similar demographics and/or system configuration or consumer behaviors. In some embodiments, the system is configured to collect data over time and/or to otherwise acquire data for a variety of reports, such as reports associated with rationing, budgeting, tracking, controlling and auditing specific use, and/or the like.

Figure 6A:
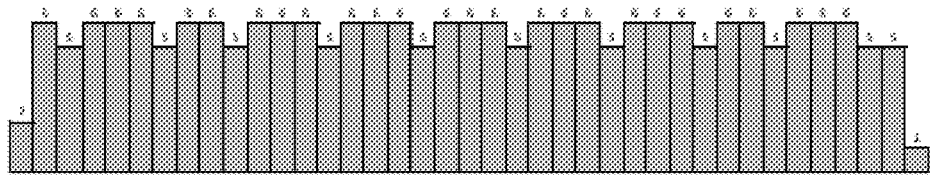
FIGS. 6A-6H show visual representations of various representative water event fingerprints.
Figure 6B:
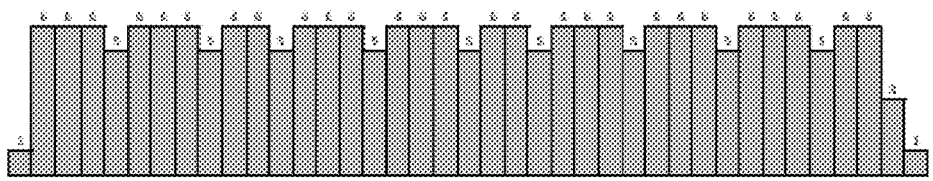

Referring to FIGS. 6A and 6B, each vertical bar shown represents a sampling of magnetic pulses sensed at 1 hz. Accordingly, the events represented each had a duration of 39 seconds, which is the difference between its respective 'End Time' and 'Start Time'. The numeric value above each bar in the chart is the reading/value sensed at the associated time. In some embodiments, the system determines 'Total Pulses' of the event, which is the sum of all the readings taken during the event. In some embodiments, the system generates a 'Flow Data String', such as a comma delimited list of the pulse readings throughout the duration of the event. In some embodiments, the system generates a 'Differential Flow String', such as a comma delimited list of the change in a pulse reading from and relative to the previous reading. In some embodiments, the system is configured to calculate 'Mean' and/or 'Median' values for each event, such as by using an entire pool of readings for the event. In some embodiments, the system is configured to calculate a 'Number of Estimated Gallons' such as by using a measured, pre-determined value specific to the water meter and/or other flow metering device (ex: 100 pulses=1 gallon).

Some embodiments of the present invention include training the system to recognize a plurality of water events, such as first and second water events. It will be appreciated that each water event can be a different class of water events (i.e. toilet flushing, machine filling, faucet running, etc.) and/or one or more water event can be of a similar class as one or more other water event (i.e. two or more toilets, two or more machines, two or more faucets, etc.) In some embodiments, the method includes performing a first water event (such as flushing a first toilet, performing a first fill operation for a first machine, turning on a first faucet, etc.), allowing the system to sense water flow associated with the first water event, recording sensed impulses, associating sensed impulses with each other so as to ascertain a first fingerprint for the first water event, and associating the first fingerprint with the first water event, thereby creating a first baseline fingerprint (see FIG. 6A) associated with the first water event. In this way a user is able to train the system to recognize a future occurrence of the first water event by comparing a measured fingerprint (see FIG. 6B) with the first baseline fingerprint (see FIG. 6A).

In some embodiments, the example shown in FIG. 6A is associated with a flushing event for a first toilet during a training session such that the fingerprint is used to ascertain a baseline fingerprint for the first toilet. In such embodiments, fingerprint variables/values of a first baseline fingerprint are as follows:
  Start Time=2019-01-05 18:02:17.000
  End Time=2019-01-05 18:02:56.000
  Total Pulses/Tally=214
  Duration in Seconds=39
  Number of estimated gallons=2.14
  Flow Data String=2,6,5,6,6,6,5,6,6,5,6,6,6,5,6,6,6,5,6,6, 6,5,6,6,6,5,6,6,6,5,6,6,5,6,6,6,5,5,1
  Differential Flow String=0,+4,−1,+1,0,0,−1,+1,0,−1,+1,0, 0,−1,+1,0,0,−1,+1,0,0,−1,+1,0,0,−1,+1,0,0,−1,+1,0,− 1,+1,0,0,−1,0,−4
  Mean/Average Pulse Reading=5.49 (214/39)
  Median=6

In some embodiments, the system is configured to compare the measured fingerprint with a plurality of baseline fingerprints and is further configured to determine which baseline fingerprint of the plurality of fingerprints the measured fingerprint most closely matches. In some embodiments, the example shown in FIG. 6B is associated with a flushing event for the first toilet during normal operation of the system such that the fingerprint is compared to a plurality of baseline fingerprints so as to identify the water event. In such embodiments, fingerprint variables/values of a first measured fingerprint are as follows:
  Start Time=2019-01-05 19:05:22.000
  End Time=2019-01-05 19:06:01.000
  Total Pulses/Tally=212
  Duration in Seconds=39
  Number of estimated gallons=2.12
  Flow Data String=1,6,6,6,5,6,6,6,5,6,6,5,6,6,6,5,6,6,6,5, 6,6,5,6,6,6,5,6,6,6,5,6,6,6,5,6,6,3,1
  Differential Flow String=0,+5,0,0,−1,+1,0,0,−1,+1,0,−1,+ 1,0,0,−1,+1,0,0,−1,+1,0,−1,+1,0,0,−1,+1,0,0,−1,+1,0, 0,−1,+1,0,−3,−2
  Mean/Average Pulse Reading=5.44 (212/39)
  Median=6

In the matching example shown in FIGS. 6A and 6B, fingerprint matching properties are as follows:

| Allowable Deviation % | Actual Deviation % | Likely Match (within allowable)? |
|---|---|---|
| 0.05 | 39/39 = 1 = 0% | Yes (0% deviation) |
| 0.1 | 212/214 = 0.99 = 1% | Yes (1% deviation) |
| 0.1 | 5.44/5.49 = 0.99 = 1% | Yes (0% deviation) |
| 0.25 | 6/6 = 1 = 0% | Yes (0% deviation) |
| 0.15 | 6/6 = 1 = 0% | Yes (0% deviation) |
| 0.15 | 1/1 = 1 = 0% | Yes (0% deviation) |

In some embodiments, the method includes performing a second water event (such as flushing a first or second toilet, performing a first or second fill operation for a first or second machine, turning on a first or second faucet, etc.), allowing the system to sense water flow associated with the second water event, recording sensed impulses, associating sensed impulses with each other so as to ascertain a second fingerprint (see FIG. 6C) for the second water event, and associating the second fingerprint with the second water event, thereby creating a second baseline fingerprint. In this way a user is able to train the system to recognize a future occurrence of the second water event (see FIG. 6D) by comparing a measured fingerprint with the second baseline fingerprint.

Figure 6C:

In some embodiments, the example shown in FIG. 6C is associated with a flushing event for a second toilet during a training session such that the fingerprint is used to ascertain a baseline fingerprint for the second toilet. In such embodiments, fingerprint variables/values of a second baseline fingerprint are as follows:
  Start Time=2019-03-06 5:05:20.000
  End Time=2019-03-06 5:06:23.000
  Total Pulses/Tally=156
  Duration in Seconds=63
  Number of estimated gallons=1.56
  Flow Data String=2,3,2,3,2,3,2,3,2,3,2,3,2,3,2,3,2,3,2 . . . 2 (some readings replaced with the ellipsis)
  Differential Flow String=0,+1,−1,+1,−1,+1,−1,+1,−1,+ 1,−1,+1,−1,+1,−1,+1,−1,+1,−1,+1,−1,0 . . . (some readings replaced with the ellipsis)
  Mean/Average Pulse Reading=2.48 (156/63)
  Median=2

Figure 6D:
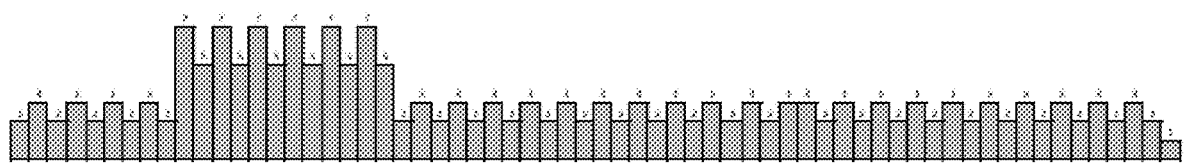

In some embodiments, the system is configured to compare the measured fingerprint with a plurality of baseline fingerprints and is further configured to determine whether the measured fingerprint is single fingerprint or a composite of more than one fingerprint. In some embodiments, the example shown in FIG. 6D is associated with two water events, which are a flushing event for the second toilet and a hand washing event associated with a first faucet. In such embodiments, fingerprint variables/values of measured composite fingerprint are as follows:
  Start Time=2019-03-07 06:04:57.000
  End Time=2019-03-07 06:06:01.000
  Total Pulses/Tally=200
  Duration in Seconds=64
  Number of estimated gallons=2.00
  Flow Data String=2,3,2,3,2,3,2,3,2,7,5,7,5,7,5,7,5,7,5,7, 5,2 . . . 1 (some readings replaced with the ellipsis)
  Differential Flow String=0,+1,−1,+1,−1,+1,−1,+1,−1,+ 5,−2,+2,−2,+2,−2,−F2,−2,+2,−2,−F2,−2,−3 . . . −1 (some readings replaced with the ellipsis)
  Mean/Average Pulse Reading=3.13 (200/64)
  Median=3

In the matching example shown in FIGS. 6C and 6D, fingerprint matching properties are as follows:

| Property Name | Allowable Deviation % | Actual Deviation % | Likely Match (within allowable)? |
|---|---|---|---|
| Duration | 0.05 | 64/63 = .02 = 2% | Yes (2% deviation) |
| Total Pulse Count | 0.1 | 200/156 = 1.28 = 28% | No (28% deviation) |
| Mean Flow Data Value | 0.1 | 3.13/2.48 = 1.26 = 26% | No (26% deviation) |
| Median Flow Data Value | 0.25 | 3/2 = 1.5 = 50% | No (50% deviation) |
| Max Flow Data Value | 0.15 | 7/3 = 2.33 = 133% | No (133% deviation) |
| Min Flow Data Value | 0.15 | 1/2 = 0.5 = 50% | No (50% deviation) |

Figure 6E:
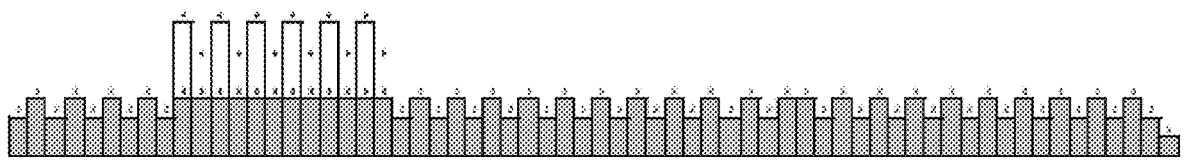
Figure 6F:
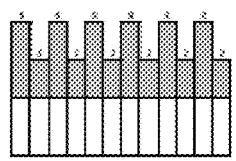

In the example shown above, an initial match was made with a very low degree of certainly. In some embodiments, the system is configured to iteratively re-compare measured fingerprints with baseline fingerprints, such as after running through different data washing and matching property weighting techniques and variations. In the example shown in FIG. 6E, the spike of FIG. 6D is substituted for the mean value for the entire event, thereby resulting in the following adjusted data:

Start Time=2019-03-07 06:04:57.000
End Time=2019-03-07 06:06:01.000
Total Pulses/Tally=164
Duration in Seconds=64
Number of estimated gallons=1.64
Flow Data String=2,3,2,3,2,3,2,3,2,7,5,7,5,7,5,7,5,7,5,7, 5,2 . . . 1 (some readings replaced with the ellipsis)
Differential Flow String=0,+1,−1,+1,−1,+1,−1,+1,−1,+ 5,−2,+2,−2,+2,−2,−F2,−2,+2,−2,−F2,−2,−3 . . . −1 (some readings replaced with the ellipsis)
Mean/Average Pulse Reading=2.56 (164/64)
Median=3

In some embodiments, adjusting the information, such as by substituting mean values for spike values (i.e. normalizing the data), enables the system to obtain a match with a higher degree of confidence. In the matching example shown in FIGS. 6C and 6E, fingerprint matching properties for the normalized data are as follows:

| Property Name | Allowable Deviation % | Actual Deviation % |
|---|---|---|
| Duration | 0.05 | 64/63 = .02 = 2% |
| Total Pulse Count | 0.1 | 164/156 = 1.05 = 5% |
| Mean Flow Data Value | 0.1 | 2.56/2.48 = 1.03 = 3% |
| Median Flow Data Value | 0.25 | 3/2 = 1.03 = 3% |
| Max Flow Data Value | 0.15 | 3/3 = 1 = 0% |
| Min Flow Data Value | 0.15 | 1/2 = 0.5 = 50% |

In the example shown above, a secondary match was made with a higher degree of certainly than was possible for the initial match. In some embodiments, the system is configured to determine a fingerprint for a secondary water event (see FIG. 6E) by comparing the measured fingerprint (see FIG. 6D) with the baseline fingerprint (see FIG. 6C), such as by subtracting values of individual pulses of the baseline fingerprint from values of corresponding impulses of the measured fingerprint.

Figure 6G:
Figure 6H:
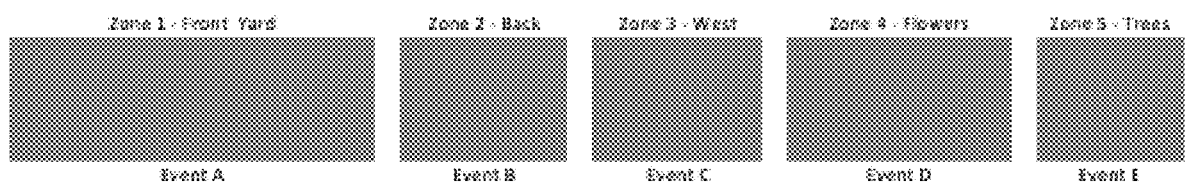
Figure 7A:
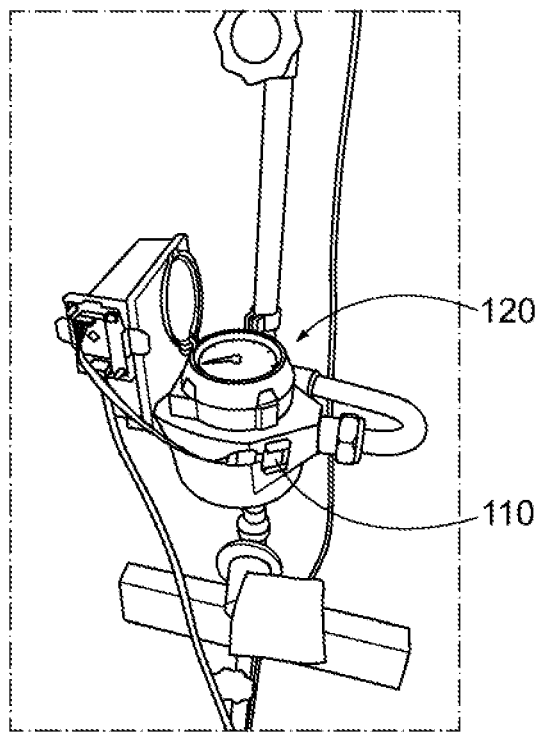
FIGS. 7A and 7B are pictures showing sensors affixed to flow meters.
Figure 7B:
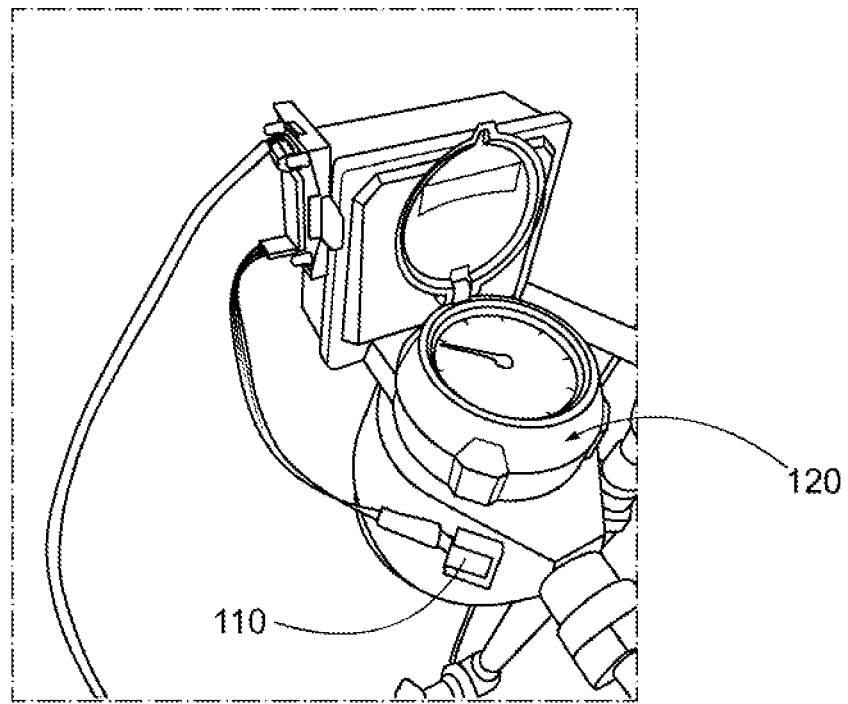
Figure 8A:
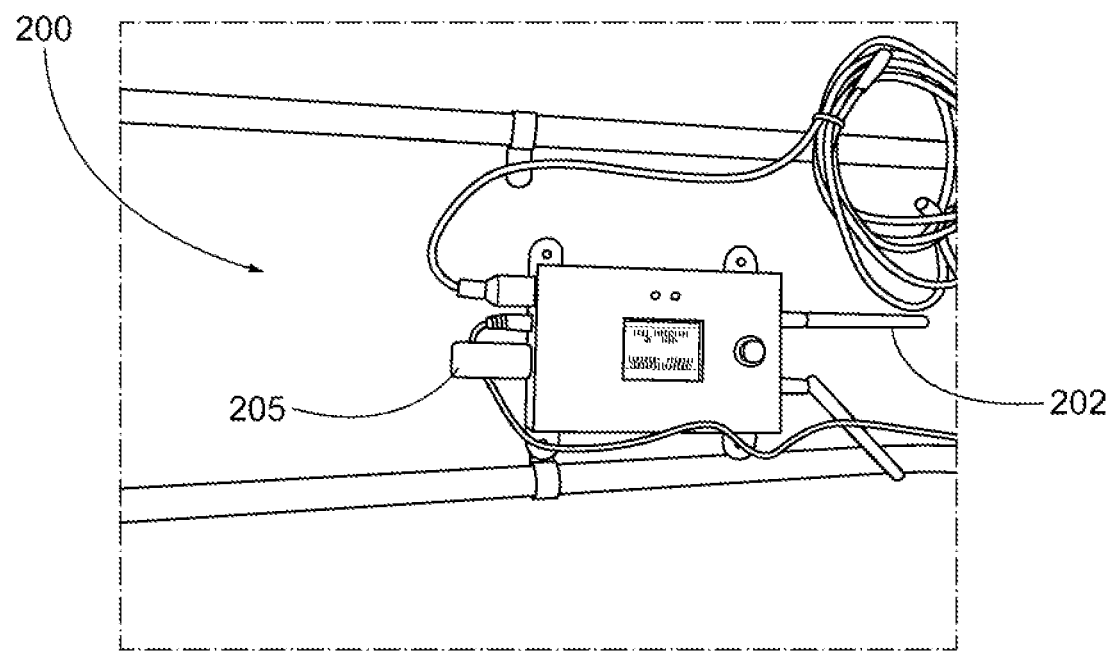
FIGS. 8A and 8B are pictures showing processors of the present invention, each having antennas and a thumb drive engaged therewith.
Figure 8B:
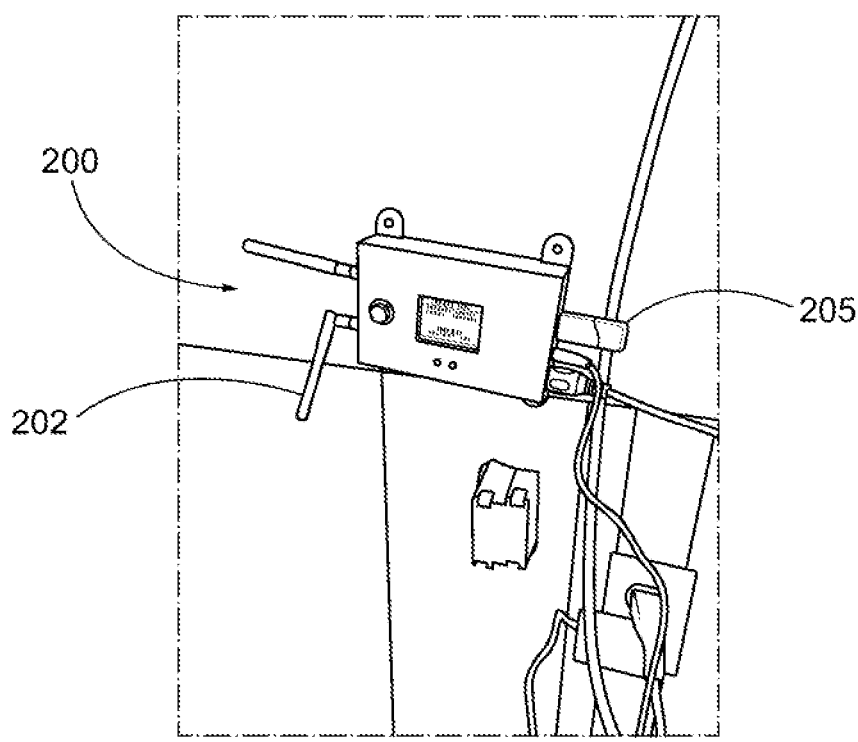
Figure 9A:
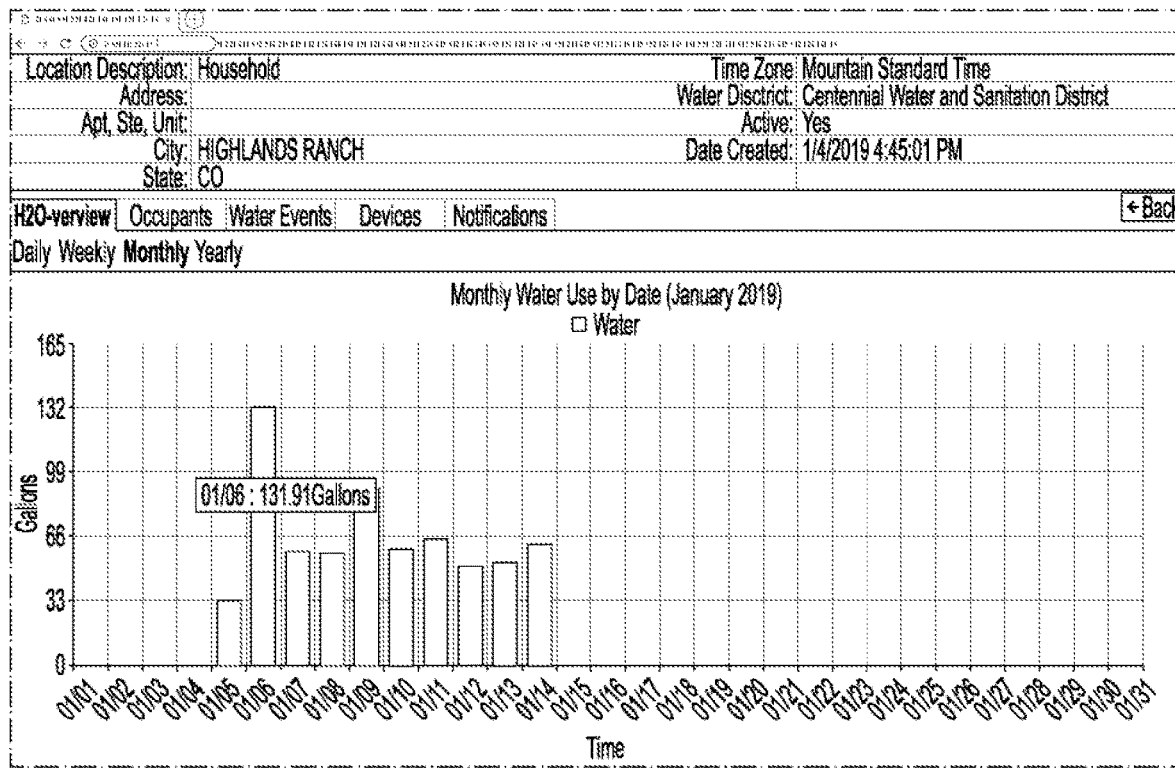
FIGS. 9A and 9B are screenshots of output screens of an embodiment of the present invention, the screenshot showing water usage over a period of time.
Figure 9B:
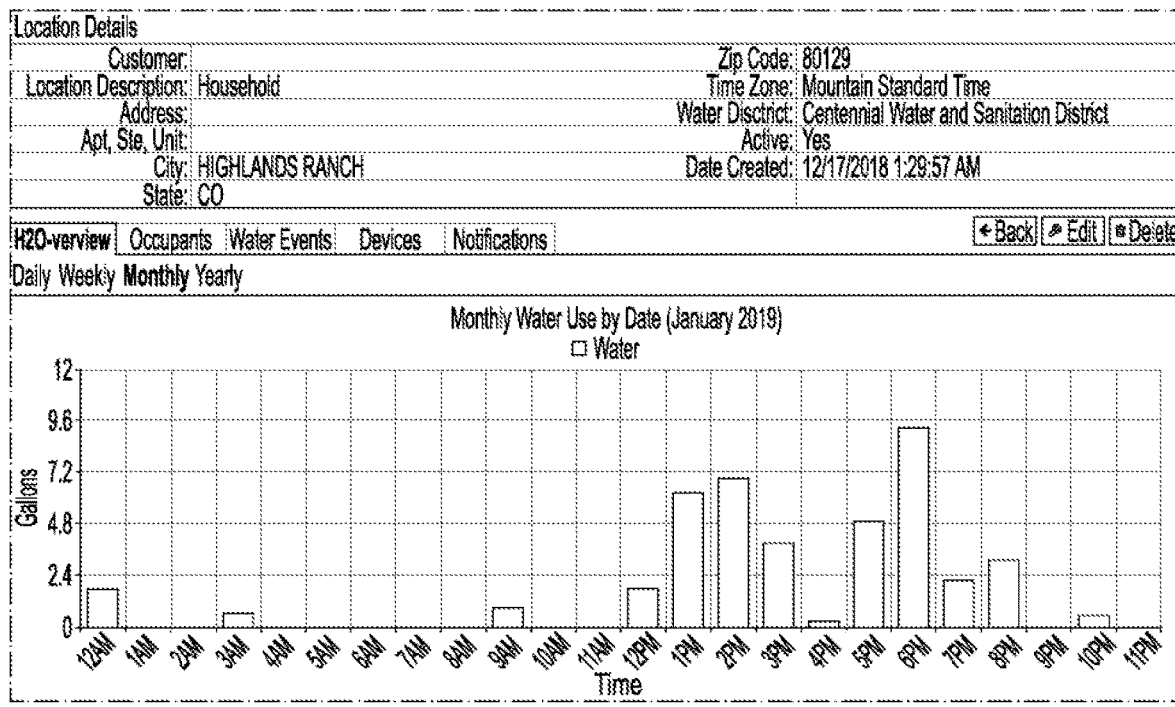

Referring to FIGS. 6G and 6H, some embodiments of the present invention are configured to determine one or more water event based on known and/or repeatable values over a long period of time, such as for washing machines, sprinkler systems, and the like.

In some embodiments, the example shown in FIG. 6G is associated with a washing machine having an initial fill cycle, a wash cycle, an initial drain cycle, a secondary fill cycle, a rinse cycle, and a secondary drain cycle. As can be seen, water flow is measured during each fill cycle, but no water flow is measured during a long period of time between the fill cycles. In some embodiments, the system is configured to record the first and second fill cycles as independent baseline fingerprints. In some embodiments, the system is configured to record the first and second fill cycles as a single fingerprint. In some embodiments, fingerprint variables/values of associated with the same are as follows:

Start Time=2019-03-08 12:01:15.000
End Time=2019-03-08 12:57:19.000
Total Pulses/Tally=2276
Duration in Seconds=3364
Number of estimated gallons=22.76
Flow Data String=(not shown due to space constraints)
Differential Flow String=(not shown due to space constraints)
Mean/Average Pulse Reading=(not shown due to space constraints)
Median=(not shown due to space constraints)

In some embodiments, the example shown in FIG. 6H is associated with a sprinkler system that is configured to water different zones at different times. In some embodiments, the system is configured to record watering each zone as an independent baseline fingerprint. In some embodiments, the system is configured to record the watering of all zones (or at least the watering of a plurality of zones) as a single fingerprint. In some embodiments, fingerprint variables/values of associated with the same are as follows:

Start Time=2019-03-08 5:00:04.000
End Time=2019-03-08 5:43:45.000
Total Pulses/Tally=22400
Duration in Seconds=2621
Number of estimated gallons=224
Flow Data String=(not shown due to space constraints)
Differential Flow String=(not shown due to space constraints)
Mean/Average Pulse Reading=(not shown due to space constraints)
Median=(not shown due to space constraints)

Various embodiments of computer programs, devices, systems, and methods of the present invention are implemented in hardware, software, firmware, or combinations thereof using central management system of the invention, which broadly comprises server devices, computing devices, a communications network, and access ID (account number, etc.). Various embodiments of the server devices include computing devices that provide access to one or more general computing resources, such as Internet services, electronic mail services, data transfer services, and the like. In some embodiments the server devices also provides access to a database that stores information and data, with such information and data including, without limitation, system user information (e.g. ID, account number, etc.), water system information, fixture specifications and locations, appliance specifications and locations, or the like, or other information and data necessary and/or desirable for the implementation of the computer program, devices, systems, and methods of the present invention.

Various embodiments of the server devices and the computing devices include any device, component, or equipment with a processing element and associated memory elements. In some embodiments the processing element implements operating systems, and in some such embodiments is capable of executing the computer program, which is also generally known as instructions, commands, software code, executables, applications (apps), and the like. In some embodiments the processing element includes processors, microprocessors, microcontrollers, field programmable gate arrays, and the like, or combinations thereof. In some embodiments the memory elements are capable of storing or retaining the computer program and in some such embodiments also store data, typically binary data, including text, databases, graphics, audio, video, combinations thereof, and the like. In some embodiments the memory elements also are known as a "computer-readable storage medium" and in some such embodiments include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, in some embodiments the server devices further include file stores comprising a plurality of hard disk drives, network attached storage, or a separate storage network.

Various embodiments of the computing devices specifically include mobile communication devices (including wireless devices), work stations, desktop computers, laptop computers, palmtop computers, tablet computers, portable digital assistants (PDA), smart phones, wearable devices and the like, or combinations thereof. Various embodiments of the computing devices also include voice communication devices, such as cell phones or landline phones. In some preferred embodiments, the computing device has an electronic display, such as a cathode ray tube, liquid crystal display, plasma, or touch screen that is operable to display visual graphics, images, text, etc. In certain embodiments, the computer program of the present invention facilitates interaction and communication through a graphical user interface (GUI) that is displayed via the electronic display. The GUI enables the user to interact with the electronic display by touching or pointing at display areas to provide information to the user control interface, which is discussed in more detail below. In additional preferred embodiments, the computing device includes an optical device such as a digital camera, video camera, optical scanner, or the like, such that the computing device can capture, store, and transmit digital images and/or videos, identification codes or other identification information.

In some embodiments the computing devices includes a user control interface that enables one or more users to share information and commands with the computing devices or server devices. In some embodiments, the user interface facilitates interaction through the GUI described above or, in other embodiments comprises one or more functionable inputs such as buttons, keyboard, switches, scrolls wheels, voice recognition elements such as a microphone, pointing devices such as mice, touchpads, tracking balls, styluses. Embodiments of the user control interface also include a speaker for providing audible instructions and feedback. Further, embodiments of the user control interface comprise wired or wireless data transfer elements, such as a communication component, removable memory, data transceivers, and/or transmitters, to enable the user and/or other computing devices to remotely interface with the computing device.

In various embodiments the communications network will be wired, wireless, and/or a combination thereof, and in various embodiments will include servers, routers, switches, wireless receivers and transmitters, and the like, as well as electrically conductive cables or optical cables. In various embodiments the communications network will also include local, metro, or wide area networks, as well as the Internet, or other cloud networks. Furthermore, some embodiments of the communications network include cellular or mobile phone networks, as well as landline phone networks, public switched telephone networks, fiber optic networks, or the like.

Various embodiments of both the server devices and the computing devices are connected to the communications network. In some embodiments server devices communicate with other server devices or computing devices through the communications network. Likewise, in some embodiments, the computing devices communicate with other computing devices or server devices through the communications network. In various embodiments, the connection to the communications network will be wired, wireless, and/or a combination thereof. Thus, the server devices and the computing devices will include the appropriate components to establish a wired or a wireless connection.

Various embodiments of the computer program of the present invention run on computing devices. In other embodiments the computer program runs on one or more server devices. Additionally, in some embodiments a first portion of the program, code, or instructions execute on a first server device or a first computing device, while a second portion of the program, code, or instructions execute on a second server device or a second computing device. In some embodiments, other portions of the program, code, or instructions execute on other server devices as well. For example, in some embodiments information is stored on a memory element associated with the server device, such that the information is remotely accessible to users of the computer program via one or more computing devices. Alternatively, in other embodiments the information is directly stored on the memory element associated with the one or more computing devices of the user. In additional embodiments of the present invention, a portion of the information is stored on the server device, while another portion is stored on the one or more computing devices. It will be appreciated that in some embodiments the various actions and calculations described herein as being performed by or using the computer program will actually be performed by one or more computers, processors, or other computational devices, such as the computing devices and/or server devices, independently or cooperatively executing portions of the computer program.

A user is capable of accessing various embodiments of the present invention via an electronic resource, such as an application, a mobile "app," or a website. In certain embodiments, portions of the computer program are embodied in a stand-alone program downloadable to a user's computing device or in a web-accessible program that is accessible by the user's computing device via the network. For some embodiments of the stand-alone program, a downloadable version of the computer program is stored, at least in part, on the server device. A user downloads at least a portion of the computer program onto the computing device via the network. After the computer program has been downloaded, the program is installed on the computing device in an executable format. For some embodiments of the web-accessible computer program, the user will simply access the computer program via the network (e.g., the Internet) with the computing device.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A monitoring system for monitoring water usage associated with a first water system, the monitoring system comprising:
   a sensor positioned adjacent to a flow meter of the first water system, the sensor being configured to detect field fluctuations emanating from the flow meter as the flow meter measures a real-time water flow rate through the first water system;
   a data storage device and a plurality of fingerprints stored thereon, each fingerprint comprising information associated with a respective water event; and
   a processor for comparing the detected field fluctuations with the stored fingerprints so as to determine which water events have occurred,
   wherein each water event is associated with at least one of a water consumption event or a water loss event;
   wherein a first fingerprint of the plurality of fingerprints is associated with a single water event and a second fingerprint of the plurality of fingerprints is a composite fingerprint that is associated with a composite water event, the composite water event being an aggregate of two or more water events, and
   wherein the system is configured to determine sequential and simultaneous water events associated with one or more composite fingerprints.

2. The monitoring system of claim 1, further comprising the flow meter, wherein the flow meter comprises a nutating disk, and wherein the field is a magnetic field generated by the nutating disk.

3. The monitoring system of claim 1, wherein the first fingerprint is associated with a first water device, the first water device being an appliance selected from a list comprising a dishwasher, a laundry machine, and an ice maker, and wherein the second fingerprint is associated with the first water device and a second water device, the second water device being independent from the first water device.

4. The monitoring system of claim 1, wherein the first fingerprint is associated with a water loss event selected from a list comprising a small water leak, a broken water line, and a leaking toilet, and wherein the second fingerprint is associated with a water loss event and a water consumption event.

5. The monitoring system of claim 1, wherein the first fingerprint is associated with a first water device, the first water device being a fixture selected from a list comprising a sink faucet, a bath faucet, a shower head, a toilet, an exterior faucet, a sprinkler, and an irrigation valve, and wherein the second fingerprint is associated with the first water device and a second water device, the second water device being independent from the first water device.

6. A reporting system for reporting water usage associated with a first water system, the reporting system comprising:
   a sensor positioned adjacent to a flow meter of the first water system, the sensor being configured to detect field fluctuations emanating from the flow meter as the flow meter measures a real-time water flow rate through the first water system;
   a data storage device and a plurality of fingerprints stored thereon, each fingerprint comprising information associated with a respective water event; and
   a processor for comparing the detected field fluctuations with the stored fingerprints so as to determine which water events have occurred,
   wherein each water event is associated with at least one of a water consumption event or a water loss event,
   wherein a first fingerprint is associated with a single water event and a second fingerprint is a composite fingerprint that is associated with a composite water event, the composite water event being an aggregate of two or more water events, and
   wherein the system is configured to determine sequential and simultaneous water events associated with one or more composite fingerprints.

7. The reporting system of claim 6, wherein the system is configured to provide an indication to a user when water consumption for a specific water event has exceeded an allowable threshold value for the specific event.

8. The reporting system of claim 7, wherein the water event is a shower, wherein the allowable threshold value is a predetermined volume of water, and wherein the indication includes a light positioned within view of a person in the shower.

9. The reporting system of claim 7, wherein providing the indication comprises sending information to an application on a mobile device.

10. The reporting system of claim 6, wherein the system is configured to report a return on investment associated with fixing a mal-adjusted fixture.

11. The reporting system of claim 6, wherein the system is configured to compare water usage of the first water system with water usage associated with a plurality of additional water systems.

12. The reporting system of claim 6, wherein the system is configured to provide a fixture-by-fixture report of water usage associated with the first water system over a first period of time.

* * * * *